United States Patent
Fritzer et al.

(12) 
(10) Patent No.: US 6,786,844 B2
(45) Date of Patent: Sep. 7, 2004

(54) CONTACT PRESSURE REGULATION SYSTEM

(75) Inventors: Anton Fritzer, Markdorf (DE); Wolfgang Reik, Bühl (DE); Andreas Deimel, Ingolstadt (DE); Ulrich Mair, Bühl (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 0 days.

(21) Appl. No.: 09/945,552

(22) Filed: Sep. 2, 2001

(65) Prior Publication Data
US 2002/0068660 A1 Jun. 6, 2002

(30) Foreign Application Priority Data
Sep. 8, 2000 (DE) .......................................... 100 44 338

(51) Int. Cl.[7] .......................... F16H 37/02; F16H 59/14
(52) U.S. Cl. ........................ 475/210; 475/213; 477/46; 474/15; 474/19; 474/21
(58) Field of Search ................................ 475/210, 213; 477/37, 44, 46; 474/12, 15, 19, 21, 23, 37, 69, 70

(56) References Cited

U.S. PATENT DOCUMENTS

| | | | | |
|---|---|---|---|---|
| 4,016,771 A | * | 4/1977 | Berens et al. | 474/19 |
| 4,160,456 A | * | 7/1979 | Hawkins et al. | 474/19 X |
| 4,425,102 A | * | 1/1984 | Huff et al. | 474/19 |
| 4,722,718 A | * | 2/1988 | Eugen | 474/19 |
| 4,788,891 A | * | 12/1988 | Katori | 474/17 |
| 5,045,028 A | * | 9/1991 | Rattunde et al. | 474/21 X |
| 6,007,452 A | * | 12/1999 | Sawada et al. | 474/12 X |
| 6,336,878 B1 | * | 1/2002 | Ehrlich et al. | 474/19 X |

FOREIGN PATENT DOCUMENTS

| | | | | |
|---|---|---|---|---|
| FR | 2537235 | * | 6/1984 | 474/15 |
| GB | 2034421 | * | 6/1980 | 474/15 |

* cited by examiner

*Primary Examiner*—Ha Ho
(74) *Attorney, Agent, or Firm*—Alfred J. Mangels

(57) ABSTRACT

The invention relates to a contact pressure system, that can be utilized particularly for continuously variable transmissions, with a torque sensor system as well as a continuously variable transmission.

71 Claims, 7 Drawing Sheets

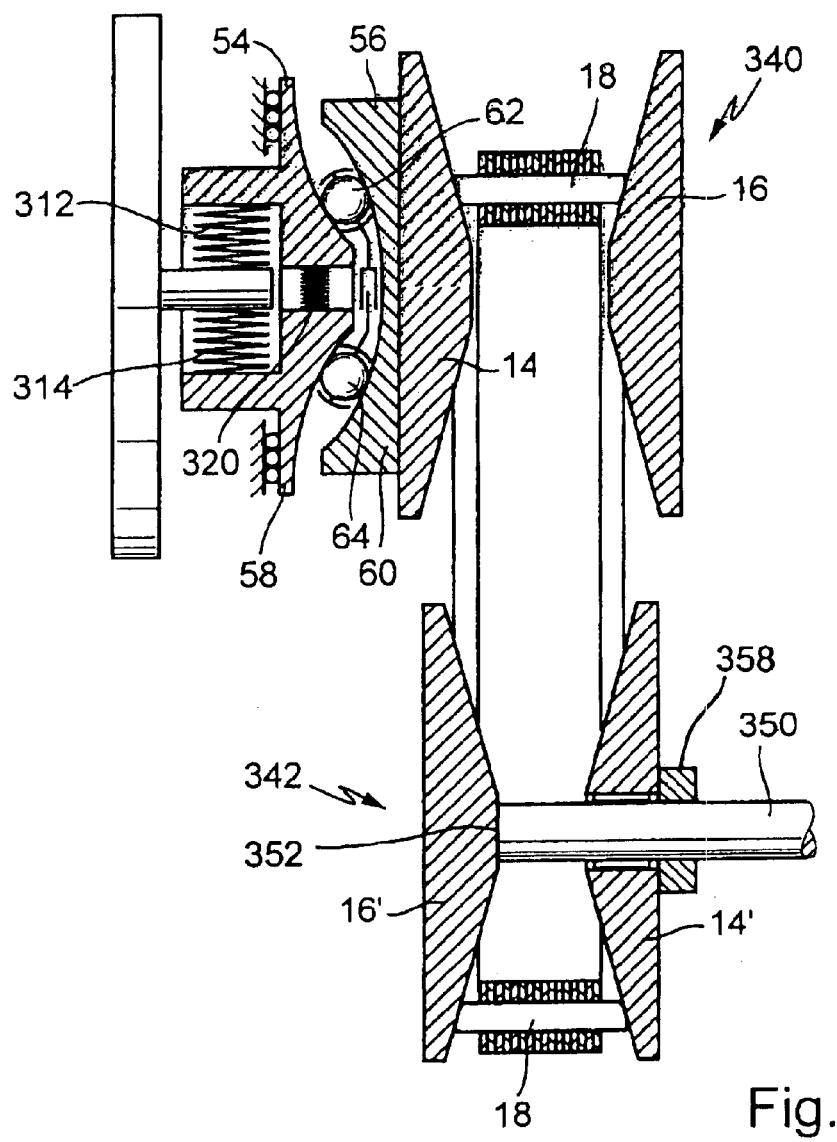
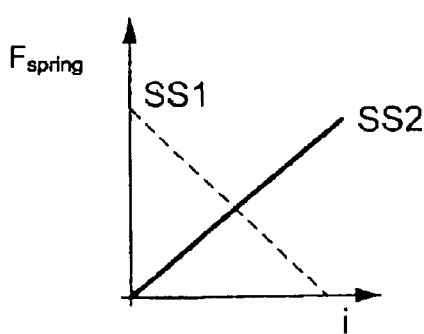
Fig. 12
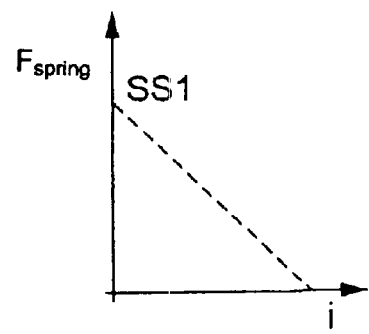
Fig. 13
Fig. 11

CONTACT PRESSURE REGULATION SYSTEM

BACKGROUND OF THE INVENTION

1. Field of the Invention

The present invention relates to a contact pressure system that can be used especially in continuously variable transmissions, in a continuously variable transmission with a contact pressure system, as well as a method for operating such contact pressure systems and/or continuously variable transmissions.

2. Description of the Related Art

Continuously variable transmissions, as well as contact pressure systems for such continuously variable transmissions and methods for the operation of such continuously variable transmissions and contact pressure systems, are known. In a known continuously variable transmission that can be used especially as a motor vehicle transmission, there are provided two pairs of conical disks whose conical disks are arranged so that they can be moved relative to each other. An endless torque-transmitting means is placed around the pairs of conical disks. The transmission ratio between those pairs of conical disks is achieved by means of coordinated adjustment of the particular pairs of conical disks, specifically, in such a way that the spacing between the conical disks of the first pair of conical disks is enlarged when the spacing between the conical disks of the second pair of conical disks is reduced, and conversely. To retain a transmission ratio that has been set, a contact pressure system with a torque sensor is utilized, which essentially is loaded by a moment that, in terms of magnitude, also exists at the input side set of conical disks. The torque acting on the torque sensor is converted, via a ramp arrangement, into a linear force, which acts upon the set of conical disks. The transmission ratio is essentially retained in cooperation with a force that acts on the set of conical disks from the endless torque-transmitting means.

The object of the invention is to produce a differently designed contact pressure system, a differently designed continuously variable transmission, as well as a differently designed method for the operation of a contact pressure system or a continuously variable transmission.

In accordance with a particular aspect, the object of the invention is to produce a contact pressure system for continuously variable transmissions wherein the contact pressure force can be adjusted in accordance with or in approximation to the current requirement with a high degree of operational reliability.

In accordance with a particular aspect, the object of the invention is to produce a differently designed contact pressure system, a differently designed continuously variable transmission, as well as a differently designed method for the operation of a contact pressure system or a continuously variable transmission, by which under different load directions, as well as load direction changes, a high degree of operational reliability is achieved.

The problem is solved by a contact pressure system which has at least one feature of the features that are described in the following description or that are shown in the drawings.

The problem is further solved by a continuously variable transmission which has at least one feature of the features that are described in the following description or that are shown in the drawings.

The problem is further solved by a method for operating a continuously variable transmission and/or a contact pressure system, that has at least one feature of the features described in the following description or that are shown in the drawings.

SUMMARY OF THE INVENTION

The invention is particularly solved by a contact pressure system that has a torque sensor system, that, on the input side, can be loaded with a torque, and that, on the output side, produces a contact pressure force which depends on the torque that is applied on the input side. This contact pressure system further has a transfer unit that transfers that torque or that power. By a transfer unit in the sense of the present invention, what is especially to be understood is a unit that is arranged within a power or moment transfer section and that causes the output moment or the output power of that unit to be changed relative to the input moment or the input power.

In particular, in the sense of the present invention, the transfer unit is to be understood to be a transmission. The transfer unit is preferably formed mechanically. Thereby it is not intended to restrict the invention in any way. The transfer unit can also be hydraulic, or hydraulic and mechanical, or formed in other ways.

It is especially preferred in accordance with the present invention that the contact pressure system operates so that in a motor vehicle with an internal combustion engine and a continuously variable transmission, power or a moment introduced from the internal combustion engine into the contact pressure system is increased within the contact pressure system, and the output side of the contact pressure system loads the continuously variable transmission.

In accordance with the invention, there is provided, especially, a contact pressure system for a continuously variable transmission, which system is associated with at least one set of disks of the continuously variable transmission. Thereby it is provided that the contact pressure system has a torque sensor system or a torque sensor, and that the torque that is introduced on the input side into the torque sensor is different from the torque that is transmitted between the sets of disks, in particular by an endless torque-transmitting means.

It should be noted that, in the sense of the present invention, by input side is to be understood preferably the side of the contact pressure system or of the torque sensor that, in the flow of power or the flow of torque, faces an internal combustion engine when a contact pressure system in accordance with the invention is utilized in a motor vehicle with an internal combustion engine in order to generate a contact pressure force on a continuously variable transmission of that motor vehicle.

It should further be noted that by a contact pressure system in the sense of the present invention is to be understood a system that is loaded with a torque on the input side and that on the output side produces a force that is especially preferred to be linearly directed. The invention should not be restricted to such contact pressure systems. The contact pressure system in accordance with the invention can especially be designed as a dry operating or a wet operating contact pressure system.

In accordance with the invention, there is particularly provided a contact pressure system with at least one torque sensor system, whereby the contact pressure system or the torque sensor system has ramps that extend at an angle with respect to the circumferential direction of the contact pressure system or the torque sensor system, and that at least cooperate in bringing about a situation where the contact pressure force produced by the contact pressure system is dependent upon the torque. The torque dependence applies especially to a torque with which the contact pressure system or the torque sensor is loaded. For different torque directions or rotation directions different ramps are preferably provided. Further, preferably different freewheels are provided for the different rotation directions. The different freewheels are in that case coupled together in such a way to ensure that both freewheels will not simultaneously block a rotational movement, and thereby through the cooperative action of the freewheels movability in both directions of rotation is simultaneously blocked.

It should be noted that by the term "at an angle to the circumferential direction" in the sense of the present invention, it is especially to be understood that the angle is given within a circumferentially defined curved surface and/or by an angle to such a fictitious curved surface.

In accordance with the invention, there is particularly provided a contact pressure system with at least one torque sensor system, whereby the contact pressure system or the torque sensor system has at least one double freewheel system that cooperates with the torque sensor.

By a double freewheel or a double freewheel system, in the sense of the present invention, is especially intended a freewheel system that has different freewheels that are so coupled together that, as a function of at least one position of the first of the freewheels, the position or the position range of the other of the freewheels can essentially be determined unambiguously. That position range includes only a part of all possible positions of the other freewheel. In particular, in accordance with the invention a double freewheel system is to be understood to be a system with two freewheels that are coupled together in such a way that a position is established in which both are defined to be open. Preferably, the freewheels are provided for different rotation directions so that the first freewheel can transmit a torque in a first direction of rotation, and that the second freewheel can transmit a torque in a second direction of rotation opposite to the first one. The freewheels are preferably coupled with a ramp system of a torque sensor system.

In accordance with the invention, there is provided, in particular, a contact pressure system with a torque sensor system that, on the output side, can produce a contact pressure force that, for example, is provided to load a set of disks of a continuously variable transmission, where the contact pressure force is dependent upon a torque that is applied on the input side of the contact pressure system or the torque sensor system, as well as on the direction of rotation of that torque. Further there is provided a switchover device that, when the direction of rotation is changed, switches over between predetermined control characteristics that depend on the direction of rotation.

A torque sensor system or a torque sensor in the sense of the present invention is particularly formed so that it has, respectively, two different ramps or ramp arrangements, of which one is intended for deceleration and one for acceleration. An arrangement of several ramps is especially designed in such a way that the ramps have a substantially identical contour.

In a motor vehicle with a contact pressure system in accordance with the present invention assembled with a continuously variable transmission, acceleration is particularly provided when an internal combustion engine that is arranged on the input side of the continuously variable transmission loads it or supplies it with energy, so that it causes to make available energy or torque at the output side of the continuously variable transmission that can drive a motor vehicle. Deceleration is particularly provided in a motor vehicle with a contact pressure system in accordance with the present invention, as well as a continuously variable transmission, when a torque is introduced into the continuously variable transmission at the output side of the continuously variable transmission, and which is conducted in the direction of the internal combustion engine through the continuously variable transmission in the drive train. Acceleration is particularly provided in a motor vehicle when a fuel proportioning member, such as a gas pedal, is operated, and deceleration is provided when the fuel proportioning member is not operated during movement of the motor vehicle.

The rotation-direction-dependent control characteristics preferably control the contact pressure force and are at least partly determined, in a particularly preferred manner, by the design or the geometry of the ramps, and thus particularly at least determine the acceleration ramp or the deceleration ramp.

In accordance with the invention there is provided, in particular, a contact pressure system with a torque sensor system as well as with a device that guarantees that at least one of the respective ramps or the respective ramps of the torque sensor, thus, particularly, the acceleration ramps and the deceleration ramps, lie in a power transmitting direction with each of the adjoining power transmitting components. The apparatus further guarantees that as a function of the load direction of the contact pressure system or the torque sensor system, one of the respective load-direction-determined ramps will be arranged in the power flow path. In particular, there is provided in accordance with the invention one or several deceleration ramps that are connected in the power flow path when a continuously variable transmission or a motor vehicle is operated in deceleration, and that one or several acceleration ramps are connected in the power flow path when the continuously variable transmission for the motor vehicle is operated during acceleration. In accordance with the invention, it is especially provided that the apparatus guarantees that a transmitting body will in each case lie in contact with one of the ramps adjoining the transmitting body.

A transmitting body in the sense of the present invention is particularly an element that is provided in a moment sensor, and between two relatively movable parts, such as ramps of a ramp arrangement, arranged in such a way that a torque can be transmitted between those parts by the transmitting body. The transmitting body is particularly arranged between two ramps that are in each case arranged in the same direction of rotation. It is certainly also preferred that the transmitting body be arranged between a ramp and a surface not shaped as a ramp.

A transmitting body in the sense of the present invention is particularly formed as a roll or roller, or as a ball, or in other ways. Particularly preferred in the sense of the present invention is a transmitting body that is formed in such a way that its surface contour makes possible rolling or sliding of the transmitting body on another body.

The apparatus particularly guarantees that the transmitting body constantly lies against one of the surfaces of the torque sensor system, which are arranged to be movable with respect to each other, and between which the transmitting body transmits or can transmit torque when the corresponding direction of rotation is provided in which the torque is to be transmitted by that transmitting body.

In accordance with the invention there is particularly provided a contact pressure system with a torque sensor system wherein the torque sensor system has differing ramps. The torque sensor system particularly has at least a first ramp by which a torque is transmitted when the torque sensor system is loaded in a first direction of rotation, as well as at least a second ramp, by which a torque is transmitted or is to be transmitted, when the torque sensor system is loaded in a second direction of rotation opposite to the first one. The first ramp is particularly a deceleration ramp and the second ramp is particularly an acceleration ramp, or conversely. In accordance with the invention there is further provided a freewheel unit that has at least one first freewheel associated with the first direction of rotation, as well as a second freewheel associated with the second direction of rotation. In accordance with the invention, it is guaranteed that jamming of the free wheels by a reversal of the torque sensor is prevented.

By a reversal of the torque sensor in the sense of the present invention is to be understood that in a rapid change of load direction, the moment sensor will return to a null position from a ramp or flank, such as the acceleration flank or the deceleration flank, and subsequently is moved to the other of those flanks or ramps to the currently needed position. In doing so, angular play >180° can occur that can lead to impacts in the drive train, and in that case possibly a resulting loss of comfort or damage to components. Those and also other negative influences are certainly particularly avoided by the invention. In particular, it is further guaranteed in accordance with the present invention that the freewheels in such a reversal will not be jammed against each other.

In accordance with the invention, there is particularly provided a contact pressure system with a torque sensor system that has a spring system, whereby the spring system operates cooperatively with the torque sensor system. Preferably, the torque is introduced into the torque sensor system on the input side through the spring system or through a part of the spring system. Especially preferred is a provision that the torque sensor system is coupled only through the spring system, or a part of the spring system, with the input side, that is, particularly the side or with components that are arranged on the side, which in a motor vehicle with a contact pressure system installed on a continuously variable transmission of the motor vehicle is turned toward, or which faces away from the continuously variable transmission, so that torques between input side components and the torque sensor system in the direction of the output side are transmitted only by the spring system or a part of the spring system.

In accordance with a preferred embodiment of the invention, the transmission ratio of the transmission unit is adjustable. It is particularly preferred that the transmission ratio apparatus is formed as a gear unit and, to be sure, especially as a planetary transmission, whereby the transmission ratio of the transmission of that type is set so that of the components carrier, sun gear, and ring gear, a structural component is coupled on the drive side, in particular in the direction of the internal combustion engine, a further component is coupled with the torque sensor system, and the third of those components is loaded by an adjusting or control device or in some other way, which operates to control the transmission ratio between both of the other components. Particularly preferred is provided that the sun gear is loaded by an internal combustion engine of a motor vehicle, the carrier of the planetary transmission loads a torque sensor, and the ring gear is loaded by a control or adjustment mechanism or in other ways. If necessary, the planet gear is arranged to be non-rotatable.

The transmission ratio of the transmission unit or of the gear unit is constant or not constant.

Preferably, the differential moment between the carrier moment and the input moment, or the moment of the sun gear, is returned as a reactive moment into the planetary transmission by the moment sensor output, or the output side of the moment sensor and the ring gear of the planetary transmission. In accordance with a preferred embodiment of the invention, the planet set of a planetary transmission is not impacted by the power train output but rather by the power train moment.

The transmission unit, which, in particular, is made as a gear unit, and which in a particularly preferred manner is formed mechanically, is, in accordance with a preferred embodiment of the invention, arranged on the input side of the torque sensor, thus, in a contact pressure system installed in a motor vehicle, in particular, between the torque sensor and the internal combustion engine of the motor vehicle. Preferably, the transmission unit or the gear unit is provided on the output side of the torque sensor system, or a gear unit is provided both on the input side and the output side of the torque sensor system.

In accordance with a preferred embodiment of the invention, the transmission unit is a so-called round or non-round gear arrangement. Particularly preferred, all torques that are introduced into the transmission unit or that derived from the transmission unit are torques with respect to the same or, from time to time, a concentric axis of rotation.

When a planetary transmission is used in the sense of the invention, the planets in particular can be designed as single stage planets or as multistage planets.

If applicable, a contact pressure system in accordance with the invention is provided with torque sensors and a transmission unit, further with a freewheel system that has one or several individual, in particular conventional, freewheels, or a double freewheel, or a freewheel system designed in some other way.

Particularly preferred are different torques that are applied to the transmission unit or the interfaces of the transmission unit to the adjoining components, whereby the largest of those torques is transmitted between the transmission unit and a torque sensor in accordance with the inventive contact pressure system.

Preferably, the torque is raised on the input side of a torque sensor, which is particularly associated with a predetermined set of disks of a transmission having an endless torque-transmitting means, or a continuously variable transmission of a motor vehicle, so that, particularly in this case, a unit is provided that has an input moment that is smaller than its output moment, so that the input moment of the torque sensor is greater than the input moment of that unit. It is not thereby intended to restrict the invention. It is further preferred that the output moment or the output force of the torque sensor is reduced so that a correspondingly diminished force will load a set of disks of a continuously variable transmission or a transmission having an endless torque-transmitting means.

The contact pressure system and/or the torque sensor, in the sense of the present invention, is configured hydraulically and/or mechanically, or in some other way.

Particularly preferred, the contact pressure system as well as the torque sensor is configured mechanically so that the force or moment transmission is brought about by mechanical parts, specifically, from the input side of the contact pressure system all the way to a set of disks.

The transmission unit of the contact pressure system can have round or non-round gears or it can be configured in some other way.

In accordance with a particularly preferred embodiment of the invention, the non-round gears are the gears of a planetary transmission.

Preferably, a portion of the contact pressure force that is produced by the contact pressure system in accordance with the invention, and which depends on the transmission ratio of a continuously variable transmission, is produced by the selection and/or configuration of the transmission unit that the contact pressure system exhibits.

Preferably, the contact pressure system generates a contact pressure force that depends both on the transmission ratio of a continuously variable transmission and on the moment with which that contact pressure system or the continuously variable transmission is loaded, where the moment-dependent portion and the gear-ratio-dependent portion of the contact pressure force are produced in different dividing mechanisms. The following is provided, in particular: the moment-dependent portion of the contact pressure force is produced via a ramp system, where those ramps in particular are designed in a linear fashion, and the portion that depends on the transmission ratio is produced via a planetary transmission with nonround gears which, in particular, is series-connected with a torque sensor with ramp system.

In a particularly preferred manner, at least one of the nonround gears has an elliptical shape. Preferably, the transmission is a planetary transmission in which the sun gear as well as the planet gears in each case are elliptical and where the ring gear is essentially star-shaped with essentially rounded transitions.

Preferably, a contact pressure system in accordance with the invention has a torque sensor with differing ramps plus a unit that determines or controls via which of those ramps a torque can be transmitted or is transmitted via the contact pressure system. This unit in particular is so designed that even in case of fast load changes, a torque transmission is possible in accordance with those load changes.

The following is provided in a preferred manner: a part of those ramps are deceleration ramps and a part of those ramps are acceleration ramps. The following is possibly provided: those deceleration ramps and acceleration ramps are at least partly uncoupled from each other, specifically in such a way that they are arranged so that they can be moved with relation to each other. By "uncoupled" is meant in particular that no coupling or connecting elements are provided, or that relative movement is guaranteed in spite of provided coupling or connecting elements. This relative movement can be facilitated by means of a spring system.

Preferably, a contact pressure system in accordance with the invention has a torque sensor with ramps, against which rests an additional component of the torque sensor. This additional component is guided actively or passively on that ramp so that there is essentially always a contact between that ramp and that component.

Active guidance in the sense of the present invention exists in particular when a component, especially one reacting to a load, such as a spring, brings about the guidance action, while a passive guidance exists in the sense of the present invention particularly when a working, especially a load-generating, component brings about the tracking guidance.

A preferred contact pressure system has at least one torque sensor with a first device and a second device. The first device is connected into the flow of power when a torque acts upon the torque sensor in a first direction of rotation, and the second device is connected into the flow of power when a torque acts upon the torque sensor in a second direction of rotation opposite to the first one. In particular, it is provided in accordance with the invention that a torque can be transmitted via the first or second device that is connected into the flow of power.

The first device preferably has a first ramp and the second device preferably has a second ramp. In a particularly preferred manner it is provided that the first ramp is arranged so that it can be swung with respect to the second ramp.

The first ramp is preferably connected or coupled to the second ramp via a spring element or a damper element. The ramps in accordance with the inventive contact pressure system—and, in particular, the first ramp and/or the second ramp—preferably extend in the circumferential direction of the torque sensor or at an angle with respect to that circumferential direction, or in the circumferential direction and in the radial direction. Possibly, the ramps are so designed that, with respect to the torque sensor, differing positions are provided on the surface of the ramps and different axial positions are associated with those positions.

Preferably, the first device has a first freewheel and the second device has a second freewheel. Those freewheels are uncoupled or they are coupled together. The positions of those freewheels are controlled by a common control device that controls both freewheels, or by separate control devices, or in some other way.

The first and the second freewheels are preferably coupled or connected with each other via a spring system.

During the switchover from the first freewheel to the second freewheel and conversely, a position is passed in which one can make sure that both freewheels are opened. This position is referred to especially as "open center" in the sense of the invention.

The first and second freewheels are preferably known, conventional freewheels, or the freewheels are formed as a double freewheel.

The first as well as the second freewheel preferably has a clamping body. This clamping body is provided particularly to make sure that it can transmit a torque, in at least one predetermined position, between two components that are arranged so that they can be moved with relation to each other. The clamping body in particular is made as a ball, or as a roller, or the like. Preferably, a common retainer is provided for the clamping bodies of the first freewheel, as well as a common retainer for the clamping bodies of the second freewheel.

In accordance with a preferred embodiment of the invention, the clamping bodies of the first freewheel are arranged with those of the second freewheel in a common retainer.

The clamping bodies of the first freewheel and/or the clamping bodies of the second freewheel preferably cooperate with a single or with two profiled and/or nonprofiled tracks. Preferably it is provided that at least one of those profiled tracks is arranged radially outside the clamping bodies of the particular freewheel that cooperate with that profiled track.

The following is provided in particular in the sense of the invention: the first freewheel is associated with a deceleration ramp system or has a deceleration ramp system, and the second freewheel is associated with an acceleration ramp system or has an acceleration ramp system, or conversely.

Preferably, in each case, at least one clamping body of the first and of the second freewheels cooperates with a profiled track, where at least one of those profiled tracks is arranged radially inside the clamping bodies that cooperate with that track.

Preferably, there is provided at least one clamping body that is associated both with the first and the second freewheel. In particular, that clamping body cooperates both with a track of the first freewheel, that is made nonprofiled or profiled, and with a corresponding or differently designed track of the second freewheel.

Preferably, there is provided a first nonprofiled track that cooperates with at least a first clamping body of the first freewheel, as well as a second nonprofiled track that cooperates with at least a second clamping body of the second freewheel, where the first and the second nonprofiled tracks are non-rotatably connected with each other. The first and the second nonprofiled tracks are spaced apart from each other, or not spaced apart from each other, in the radial direction.

Preferably, the first freewheel has a first, profiled track and the second freewheel has a second, profiled track, and those profile tracks in each case cooperate with a first clamping body or a second clamping body, or with a common clamping body, and that the first and the second profiled tracks are spaced apart, or are not spaced apart, in the radial direction.

The first profiled track is preferably non-rotatably connected with the second profiled track, or it is arranged so that it can be moved with relation to that second profiled track.

A preferred contact pressure system has a retaining device that retains predetermined clamping bodies in contact with a second running path or track, and that is possibly spaced away from a first running path, where that first and that second running track, as well as those clamping bodies, in each case are associated with the same freewheel. Possibly, a first retaining device is provided for the first freewheel and a second retaining device is provided for the second freewheel.

Preferably, a contact pressure system has a carrier device that operates between at least one clamping body and at least one track, so that, under predetermined conditions, a movement of that track exerts a force upon the clamping body, specifically, in the circumferential direction. This force is brought about in a particularly preferred manner under predetermined conditions, when the first freewheel and/or the second freewheel is switched into an opened position. In a particularly preferred manner, the carrier device is made as a friction device or has a friction device. In particular, the carrier device has a friction ring or a friction disk that extends essentially concentrically to the freewheel or concentrically to the torque sensor.

Preferably, the clamping bodies, in case of a power transmission and/or a moment transmission, are clamped via the particular freewheel between two tracks, where the term "clamps" in that sense also especially means that those particular clamping bodies press against both tracks in a form-locking and/or friction-locking manner. In a particularly preferred manner, the clamping bodies are arranged between those two tracks, specifically in the radial direction.

A preferred freewheel system in accordance with the invention has differing clamping bodies that are associated with differing freewheels and that are spaced apart in the axial direction of the freewheel system or a torque sensor. Possibly, the clamping bodies are spaced apart—alternatively or additionally—in the radial direction.

Preferably, clamping bodies of the freewheel system—that are associated with the same freewheel or different freewheels—are arranged in series and extend particularly in the circumferential direction of the freewheel system or a torque sensor system.

In accordance with a preferred embodiment of the invention, at least one track of the freewheel system is coupled with a component of the torque sensor and/or a set of disks, specifically with a movable component.

In a preferable manner, at least two tracks—that are associated with different freewheels—are arranged so that they are movable with respect to each other.

Particularly, at least one track of the first freewheel is arranged fixedly with respect to a track of the second freewheel, and another track of the first freewheel is arranged so that it can be moved relative to another track of the second freewheel.

Preferably, several clamping bodies of a freewheel touch each other so that they can possibly load each other, specifically in the circumferential direction of the torque sensor.

In accordance with a preferred embodiment of a contact pressure system in accordance with the invention, the latter has a freewheel system with two freewheels or a double freewheel, where the first clamping body or the first clamping bodies of the first freewheel are arranged at a predetermined phase angle with respect to the clamping body or clamping bodies of the second freewheel and are possibly retained at that phase angle. A predetermined first running path of the first freewheel, which is associated with at least one predetermined first clamping body, is arranged with relation to a second running path of the second freewheel—which is associated with at least a second predetermined clamping body at a predetermined phase angle. In accordance with the invention, it is provided especially that the phase angle between those clamping bodies is smaller than the phase angle between those running paths.

A freewheel system or a freewheel in accordance with the invention is particularly designed as a double clamping roll freewheel with external stars and a common retainer, or as a double clamping roll freewheel with internal stars and a common retainer, or as a double clamping roll freewheel with common clamping bodies, or as a double clamping body freewheel with a common retainer, or as some other freewheel system, or as some other double clamping body or clamping roll freewheel system.

Preferably, the freewheel in accordance with the invention is so designed that there is a first engagement in the vicinity of a switchover point, in particular, in case of a small rotational backlash, where that switchover point in particular is a position in which both freewheels are not engaged.

Preferably, the clamping rollers or clamping bodies are constantly kept against a track by means of a spring device, or by means of centrifugal force, or by means of a form-locking arrangement, or in some other way, which are associated with those particular clamping rollers or clamping bodies.

Preferably, there is provided a friction element that, at least in the area of an "open center," in other words, when both freewheels are not engaged, by way of friction connects with each other the clamping bodies or clamping rollers with a nonprofiled common running path of the two freewheels, so that a rotational connection exists due to the action of the corresponding friction force. The following is provided here in particular: in case of a relative rotation of that running path associated with both freewheels, with respect to the particular other running paths using that friction connection, the clamping rollers or clamping body rows are switched into a first engagement.

Preferably, in accordance with the invention, there are provided, with the particular freewheel, clamping rolls or clamping body rows which have one or several clamping bodies or one or several clamping rollers. Those clamping rollers or clamping body rows are preferably, in turn, connected with each other by retainers or contact each other so that the movement of one of those clamping bodies will bring about a movement of a neighboring clamping body.

In accordance with a special embodiment of the invention, the common clamping roll or clamping body row is associated with both freewheels of the freewheel system, whereby differing engagement areas are given for the different freewheels. Those different engagement areas differ especially in that a torque can be transmitted, in one of the freewheels, in differing positions of that row of clamping bodies.

Preferably, a common clamping body or clamping roller row associated with both freewheels, defined under predetermined conditions, is kept raised off a common running path, whereby that holding action is preferably brought about via a common retainer.

In accordance with a preferred embodiment of the invention, a friction element is provided which is designed as a structural unit with a possibly existing retainer—in the area of the "open center," which connects the clamping bodies or clamping rollers in a frictional manner with a nonprofiled, common running path so that there is a rotary coupling.

Possibly, at least one running path of the freewheel system is connected with a movable part of the continuously variable transmission, in particular, with a disk or a set of disks of that continuously variable transmission. It is further preferred that at least one running path of the freewheel system be formed by a component of the continuously variable transmission, or of the torque sensor, or of a set of disks, or is arranged on it.

The following is further preferred: different running paths of the freewheel system be made up of components of the moment sensor, or be coupled to that moment sensor, or be arranged on that moment sensor.

It is further preferred that a common running path, which is associated with the different freewheels, be arranged on a movable part of the moment sensor, or be coupled with it.

The invention, of course, is not hereby restricted. In particular, the running paths, especially the running paths that are movable with respect to each other, can also be made up of other parts or may be arranged on other parts.

A running path or a track of the freewheel system is in the sense of the present invention, in particular, a surface against which a clamping body is supported when—via that clamping body and that surface—a force can be transmitted, or when the freewheel is in a closed position and/or the surface that adjoins the previously mentioned surface is a surface that can guide the clamping body.

By a profiled track or running path, in the sense of the present invention, is particularly mean a track that has elevations and depressions.

By an unprofiled or nonprofiled track, in the sense of the present invention, is particularly mean a track whose surface is essentially free of any elevations and depressions, or that is essentially made level.

Preferably, in an invention-based contact pressure system, or a freewheel system, or a torque sensor, there is provided, in each case, for a set of disks of a continuously variable transmission, or for several different sets of disks of a continuously variable transmission, a common contact pressure system, or a freewheel system, or a torque sensor system is provided.

A contact pressure system in accordance with the invention is particularly provided for a continuously variable transmission in order to maintain a predetermined, set transmission ratio. This continuously variable transmission preferably has, in addition, an adjusting system by means of which the transmission ratio can be adjusted. Such an adjusting system is preferably hydraulic, or mechanical, or formed in some other way. In a particularly preferred manner, the contact pressure system also operates in the case of an adjustment of the transmission ratio, and in that case, in particular, the forces of the adjusting system and of the contact pressure system are combined for the adjusting function.

Preferably, a contact pressure system in accordance with the present invention has a spring system which makes sure that the particular ramps of the torque sensor or at least one ramp of the torque sensor here, in the direction of power transmission, rests against at least one component that adjoins the particular ramp, such as power transmission bodies, and which ensures that—as a function of the direction of loading of the torque sensor—the particular ramp, designated for that direction of loading, such as an acceleration ramp or a deceleration ramp, will be arranged in the flow of power.

To ensure that an adjoining component, such as a power transmitting body, rests against a particular ramp, it is in particular so arranged that that the power transmitting component rests against one of the surfaces between which it transmits that power or that torque when it is connected in the power flow or the torque flow.

It should be noted that, if in the sense of the invention, one talks about a ramp or a flank, is meant especially a single ramp or a pair of ramps, which are associated with each other and between which a power transmitting body is arranged, via which, between those adjoining ramps, power is transmitted via a torque, when the particular ramp is provided in the torque flow path, or an arrangement consisting of a ramp and a component with a surface that is not inclined.

Preferably, with the help of the spring system, one can determine or control which ramp, inside the torque sensor, is to be switched into the power flow or the moment flow.

Preferably, at least one ramp of the torque sensor system is coupled with a spring of the spring system. Preferably, at least one ramp of the torque sensor system is coupled via a spring of the spring system with a component that is loaded by the internal combustion engine.

In a particularly preferred manner, there is provided a spring of the spring system that is arranged between a ramp of the torque sensor and a component that is loaded by the internal combustion engine, where the flow of power from the internal combustion engine to the torque sensor system runs through that spring and, where, in particular, no other components are provided via which that flow of power can be bridged by the spring or by a spring.

Preferably, the spring system has at least one first spring that is arranged between a component loaded by the internal combustion engine and a first ramp of the torque sensor system, as well as at least one second spring that is arranged between a component loaded by the internal combustion engine and a second ramp of the torque sensor system, so that those ramps—especially when a motor vehicle is accelerating—can be loaded by the internal combustion engine via those springs.

Preferably, a spring of the spring system is increasingly released with increasing running radius of a endless torque-transmitting means which is arranged on a set of disks of a continuously variable transmission, which set is associated with that torque sensor.

Preferably, a spring of the spring system has a prestress in the case of the maximum running radius of the endless torque-transmitting means which is associated with the set of disks that is associated with that particular spring or with the torque sensor.

The spring system preferably additionally operates as a vibration damper or as a two-mass flywheel (ZMS), or it is integrated into a two-mass flywheel which is arranged in the power train of a motor vehicle.

The contact pressure system and/or the torque sensor is in particular formed mechanically.

The power transmitting body in the sense of the present invention in particular is a roller body, such as a ball, or some other component.

The term "controlling" in the sense of the present invention in particular is to be construed as "regulating" and/or "controlling," along the lines of DIN (German Industrial Standard). The same applies to concepts that are derived from the term "controlling."

BRIEF DESCRIPTION OF THE DRAWINGS

Particular aspects of the invention will be more specifically explained in the following with reference to the drawings, in which the invention is not intended to be restricted.

There is shown:

FIG. 11 shows an exemplary embodiment of the invention in a schematic, partial view;

FIG. 12 shows a force-transmission ratio plot; and

FIG. 13 shows a force-transmission ratio plot.

DESCRIPTION OF THE PREFERRED EMBODIMENTS

Figure 1:
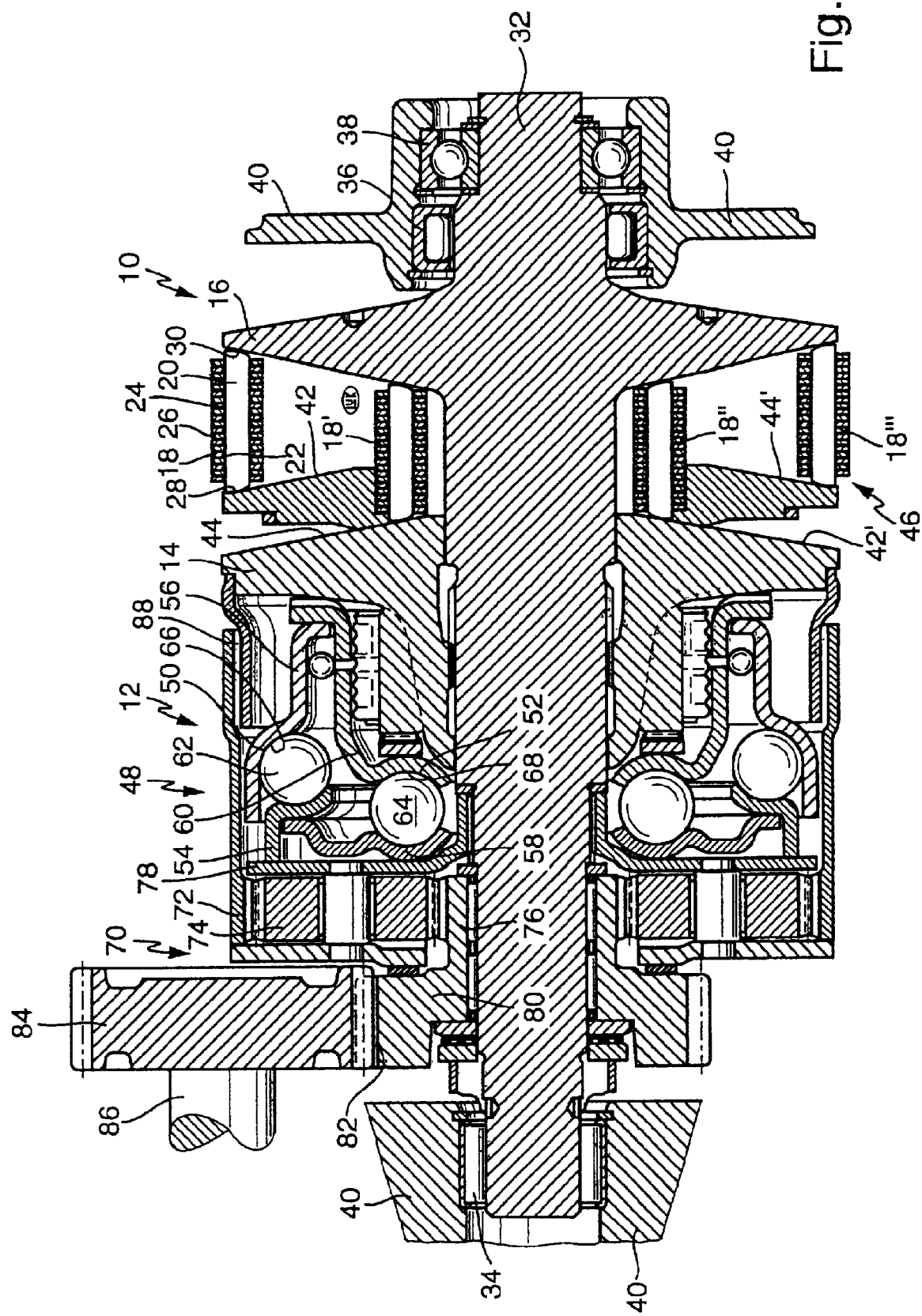
FIG. 1 shows an exemplary embodiment of the invention in a schematic representation.

FIG. 1 shows an exemplary embodiment of the invention in a schematic representation.

FIG. 1 shows in particular a partial representation of a continuously variable transmission 10 that has a contact pressure system 12.

The continuously variable transmission 10 has two sets of disks, of which FIG. 1 shows one set of conical disks with a first conical disk 14 as well as a second conical disk 16.

Positioned around the sets of conical disks is an endless torque-transmitting means that in this instance is shown as plate-link chain 18.

Plate-link chain 18 has chain links that are positioned in an articulated manner with respect to the particular adjoining, neighboring chain links. Provided at each of the link positions are rocker member pairs 20 that have two rocker members.

The rocker member pairs 20 each extend through openings 22 that are provided in links 24.

Links 24 arranged in the same chain link each have an identical or a different geometry.

The separation of different chain links is formed identically or differently. Different chain links have identically or differently configured links 24.

The rocker member pairs 20 extend laterally out of the link sets 26 and can be supported at each of their ends 28, 30 in each case on a conical disk 14, 16 so that the plate-link chain 18 can transmit a torque between the different conical disk pairs, one of which is shown in FIG. 1, by frictional engagement.

The conical disk sets each have a conical disk 16 that is rigidly coupled to a shaft 32 as well as a conical disk 14 that is non-rotatably arranged on shaft 32 in an axially movable manner. Conical disk 16 is arranged both non-rotatably on shaft 32 and also rigidly in the axial direction, and is preferably integrally formed with shaft 32.

Shaft 32 is supported by bearing units 34, 36, 38 relative to a housing or a locating unit 40.

In FIG. 1, the first conical disk of the conical disk set 14, 16 is shown in different axial positions that are indicated by the line 42 or the line 44.

FIG. 1 further illustrates the arrangement of the plate-link chain 18, 18' at those different axial positions. In the axial position indicated by line 42, the plate-link chain is arranged with respect to the set of conical disks in the way illustrated by the reference symbol 18. When the first conical disk 14 has the axial position corresponding with line 44, the plate-link chain is in the position indicated by reference numeral 18'. In case of a larger axial spacing of conical disks 14, 16, plate-link chain 18, 18' is arranged radially further inwardly. In the lower part 46 in FIG. 1, there is shown, on the one hand, the axial position of the conical disks 14, 16 of the other pair of conical disks, not otherwise shown, and on the other hand the corresponding position of plate-link chain 18.

The position of the first conical disk 14, indicated by line 42' of the other set of conical disks, that is not otherwise shown, is indicated when the conical disk set illustrated in FIG. 1 exhibits the position shown by line 42 and the position of the first conical disk of the other conical disk set, not otherwise shown, indicated by line 44' is indicated when the illustrated first conical disk 14 exhibits the position indicated by line 44. In a corresponding manner, the plate-link chain exhibits the position relative to the other set of conical disks, not otherwise shown, that is indicated by the reference numeral 18'' when the plate-link chain is in the position 18 on the illustrated conical disk set 14, 16. Position 18''' of the plate-link chain 18 is provided on the other, not otherwise illustrated, set of conical disks when plate-link chain 18 is in position 18' on the illustrated conical disk set.

When the plate-link chain in the illustrated disk set 14, 16 is arranged further radially inwardly, the plate-link chain 18 is arranged on the not illustrated disk set further radially outwardly, and conversely.

In that way one can steplessly change different transmission ratios.

The contact pressure system 12 is particularly provided to hold a respective set or controlled transmission ratio step.

The contact pressure system 12 takes into account the fact that if necessary as a function of the direction of rotation of shaft 32, different contact pressure forces must act on the movably arranged conical disk 14 to hold the transmission ratio that was set.

The contact pressure system has a torque sensor 48 with a first ramp system 50 as well as a second ramp system 52.

The first ramp system 50 has a first input member 54 as well as a first output member 56, and the second ramp system 52 has a second input member 58 as well as a second output member 60.

One of ramp systems 50, 52 is intended for deceleration and one of those ramp systems 50, 52 is intended for acceleration. Depending on whether acceleration or deceleration is specified, a torque or power is transmitted between the input member and the output member of the particular ramp system. Output member 56 or 60 of that particular ramp system 50, 52 cooperates with the first disk of disk set 14, 16 in such a way that that output member 56 or 60 loads the conical disk 14 in an axial direction, namely as a function of the torque with which the input member 54 or 58 of the particular active ramp system 50, 52 is loaded.

In accordance with the invention, it is further preferred that ramps be provided only or also on the input member of the first ramp system 50 and/or the second ramp system 52, and/or only or also on the output member of the first ramp system 50 and/or the second ramp system 52.

In order to load the output member 56 or 60 or the first conical disk 14 with an axially directed force as a function of the torque applied to input member 54 or 58, there is arranged between the particular input member 54 or 58 and the particular output member 56 or 60 a transmitting body 62 or 64 that in the exemplary embodiment shown in FIG. 1 is formed as a ball. Several transmitting bodies 62 or 64 can also be provided and distributed around the circumference. Output member 56 has a ramp 66 and output member 60 has a ramp 68.

As a function of the torque, which is transmitted to input member 54 or 58, the transmitting body 62 or 64 is caused to have a predetermined position on ramp 66 or 68. Because the ramp has a gradient that, for example, has a linear or a nonlinear shape, particularly such as in accordance with an exponential path, the input member 54 or 58 is shifted in the axial direction relative to the particular associated output member 56 or 60. It is particularly provided that the respective input members 54 and 58 are rigidly arranged relative to the second conical disk 16. Therewith, by a movement of the output member 56 or 60 the first conical disk 14 is caused to be shifted in the axial direction relative to the second conical disk 16, or the plate-link chain is loaded with a greater contact pressure force. A transmission unit is arranged on the input side of torque sensor 48 which, in the embodiment in accordance with FIG. 1 is formed as a planetary transmission 70.

Planetary transmission 70 is arranged particularly in the torque flow between a not illustrated internal combustion engine and the torque sensor 48. Planetary transmission 70 has a ring gear 72, planet gears 74, as well as a sun gear 76. Planet gears 74 are in each case coupled with each other by a carrier 78.

Input member 54 or 58 is connected with carrier 78.

The carrier torque of the planetary transmission is thereby introduced into the input member 54 or 58 of the first ramp system 50, or of the second ramp system 52, or of the torque sensor 48. Sun gear 76 of planetary transmission 70 is arranged on a sleeve 80 that further carries an additional gear 82 which in particular has external teeth. That gear 82 engages with a gear 84 which is non-rotatably connected with a shaft 86 that can be loaded by an internal combustion engine that is not shown.

Sleeve 80 is non-rotatably connected with shaft 32 so that a torque can be introduced from shaft 86 through gear stage 84, 82, or sleeve 80 and shaft 32, into disk set 14, 16.

The torque that is introduced into disk pair 14, 16 corresponds substantially with the torque that is introduced into sun gear 76 of planetary transmission 70.

Planets 74 on the one hand engage sun gear 76 and on the other hand they engage ring gear 72. Ring gear 72 is non-rotatably coupled to the output member 56 or 60 or to the first conical disk 14, or is coupled through a gear stage 88.

Preferably, the pitch diameter of sun gear 76 is smaller than the pitch diameter of gear 82, which is arranged with the sun gear on the common sleeve 80.

Planetary transmission 70 preferably has circular gears.

Figure 2:
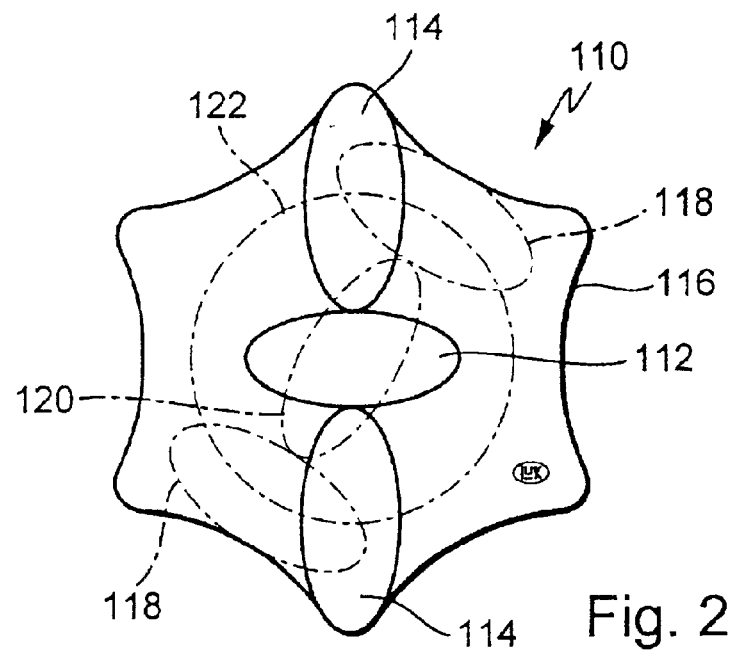
FIG. 2 shows an exemplary embodiment of the invention in a partial, schematic view.

FIG. 2 shows an exemplary embodiment of the invention in a partial diagrammatic view.

FIG. 2 in particular shows a planetary transmission 110 that, for example, can replace planetary transmission 70 in an arrangement in accordance with FIG. 1, and that has noncircular gears. Sun gear 112 as well as planet gears 114 of planetary transmission 110 are of essentially elliptical form. Ring gear 116 has an essentially star-shaped form in which the transitions are essentially in rounded form. The dashed lines 118 indicate a position that the planet gears 114 have as a result of a relative rotation over a predetermined angle of gears 112, 114, 116, and the dashed line 120 indicates the corresponding position of sun gear 112.

Dashed line 122 indicates the movement path through which the axes of the planet gears 114 pass during operation of the planetary transmission 110.

Figure 3:
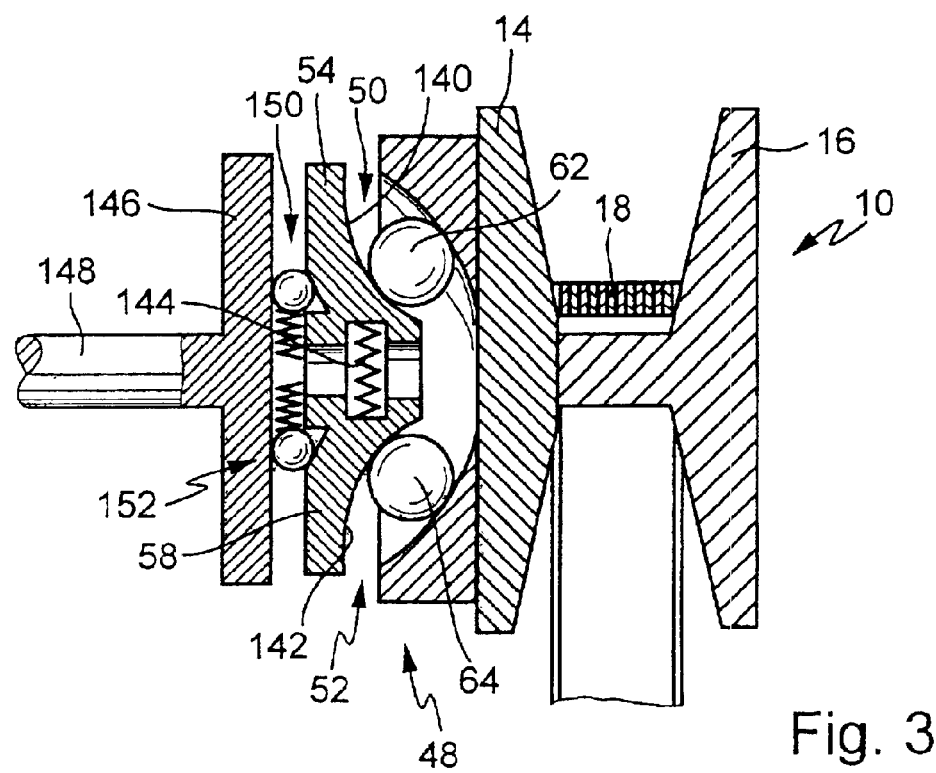
FIG. 3 shows an exemplary embodiment of the invention in a partial, schematic view.

FIG. 3 shows an exemplary embodiment of the invention in a partial diagrammatic view.

Between a first disk 14 and a second disk 16 of a set of disks of a continuously variable transmission 10 there is arranged a plate-link chain 18 that serves to transmit torque. The torque sensor 48 has a first ramp system 50 as well as a second ramp system 52, that serve during deceleration or during acceleration to transmit forces or moments from input member 54 or 58 to the first conical disk 14 or conversely. The first ramp system 50 as well as the second ramp system 52 have transmission bodies 62, 64.

Ramp 140 of the first ramp system 50 is connected with ramp 142 of the second ramp system 52 by a spring unit 144.

Between ramp 140 and a component 146, that can be loaded by shaft 148 from an internal combustion engine, that is not shown, is arranged a first freewheel 150, namely especially a conventional freewheel. In a corresponding manner, there is arranged a second freewheel 152 between the ramp 142 and the component 146, which can be loaded by the internal combustion engine that is not shown. Those freewheels 150, 152, depending on the direction of rotation of the system or the disk sets 14, 16, can cause the loading of the first conical disk 14 in the axial direction by the first ramp system 50 or by the second ramp system 52.

Figure 4:
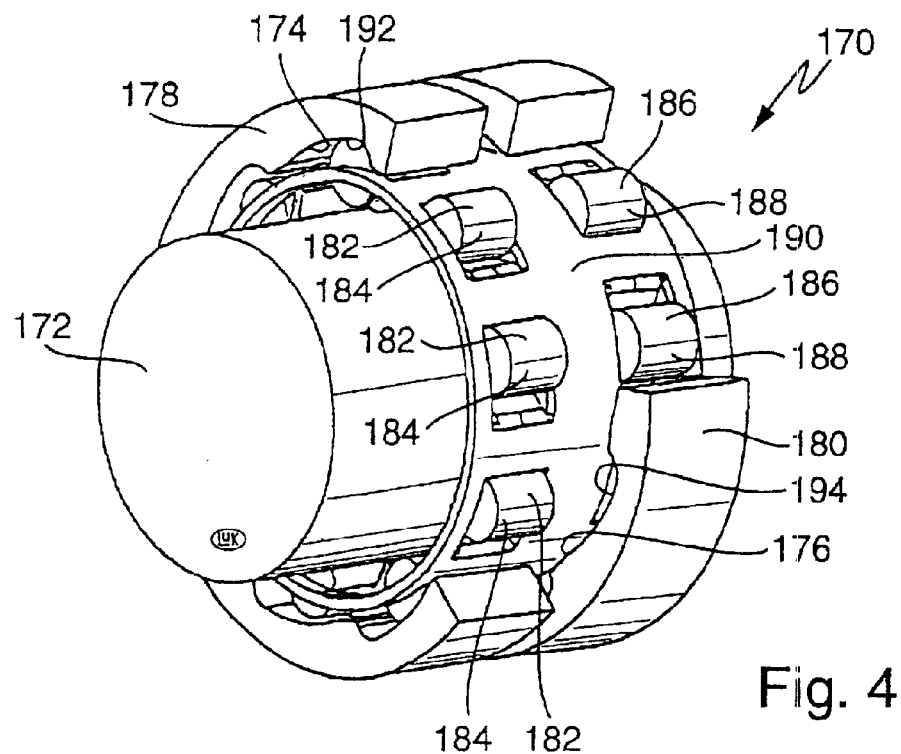
FIG. 4 shows an exemplary embodiment of the invention in a schematic, partial view.

FIG. 4 shows an exemplary, double clamping roll freewheel in accordance with the invention, with outer star-shapes and a common retainer, and which can be used to control or to establish which ramp system of a contact pressure apparatus in accordance with the invention is to be used for power or moment transmission or loading of the disk set 14, 16 in the axial direction.

This double clamping roll freewheel 170 has an unprofiled, substantially cylindrically shaped interior track 172, which in that case is formed by the surface of a shaft, as well as two profile-shaped outer tracks 174, 176. The profiled outer track 174 extends radially inward to the surface of a component 178, and the profiled outer track 176 extends to the radially inwardly-lying surface of a component 180.

A first clamping body row 182 is provided radially between the first profiled outer track 174 and the unprofiled inner track 172, and has several clamping bodies 184 that are arranged in a row in the circumferential direction of the double clamping roll freewheel 170.

In a corresponding manner, between the second profiled outer track 176 and the unprofiled inner track 172, viewed in the radial direction, there is provided a second clamping body row 186 that has several second clamping bodies 188 arranged in a row, viewed in the circumferential direction of the double clamping roll freewheel 170.

The unprofiled inner track 172 is associated both with the first clamping body row 182 and the second clamping body row 186, whereby those clamping body rows 182, 186 can in each case be supported, under predetermined conditions, on the unprofiled inner track 172. Components 178, 180, or the first profiled outer track 174 and the second profiled outer track 176, are arranged to be movable relative to each other, namely in the circumferential direction of the double clamping roll freewheel 170.

The first clamping bodies 184 of the first damping body row 182 are arranged in a retainer 190.

The second clamping bodies 180 of the second clamping body row 186 are arranged in the same retainer 190 as the first clamping bodies 184. In that way the relative movability of the first clamping body row with relation to the second clamping body row 182 can be at least limited, or prevented.

The first component 178 is preferably connected with an input member 54, not shown in FIG. 4, of a first ramp system or a torque sensor 48, and the second component 180 or the second profiled outer track 176 is preferably connected with the second input member 58 of a second ramp system or of a torque sensor 48.

Particularly preferred, the double clamp roll freewheel system shown in FIG. 4 is used in an embodiment in accordance with FIG. 3 in place of the freewheels 150, 152 there shown. The corresponding information applies to the double clamping roll or double clamping body freewheels shown in FIGS. 5 to 7.

The double clamping roll freewheel shown in FIG. 4 is so configured that in case of a load in a first direction of rotation, the first clamping bodies 184 are releasably clamped or are so arranged between the unprofiled inner track 172 and the first profiled outer track 174 that a torque can be transmitted between those tracks 172, 174 by the first clamping bodies 184, and by loading in the opposite direction of rotation the second clamping bodies 188 will be so arranged or clamped in such a way, or in the corresponding manner, between the unprofiled inner track 172 and the second profiled outer track 176 that a torque can be transmitted between those two tracks 172, 176.

Preferably a position is provided between those positions in which a torque can be transmitted from time to time, in which a torque can be transmitted neither by the freewheel with the first clamping bodies 184 nor by the freewheel with the second clamping bodies 188.

In accordance with the invention, it is particularly provided that when a torque can be transmitted between the unprofiled inner track 172 and the first profiled outer track 174 by the first clamping bodies, no torque can be transmitted between the unprofiled inner track 172 and the second profiled outer track 176 by the second clamping bodies 188, and conversely.

As shown in FIG. 4, the profiles 192, 194 of the first profiled outer track 174 or the second profiled outer track 176 are shaped or arranged differently. Those profiles 192, 194 can, however, also have the same contour. From FIG. 4 it is particularly evident that a profile 192 of the first freewheel, viewed in the circumferential direction and clockwise, has a slight inclination in places at which the profile 194 of the second profiled outer track 176 has a larger gradient, and conversely. In particular, the first profiled outer track 174 is so configured in the circumferential direction and when running in the clockwise direction, as the second profiled outer track 176, viewed in the circumferential direction, when running in the counterclockwise direction.

Figure 5:
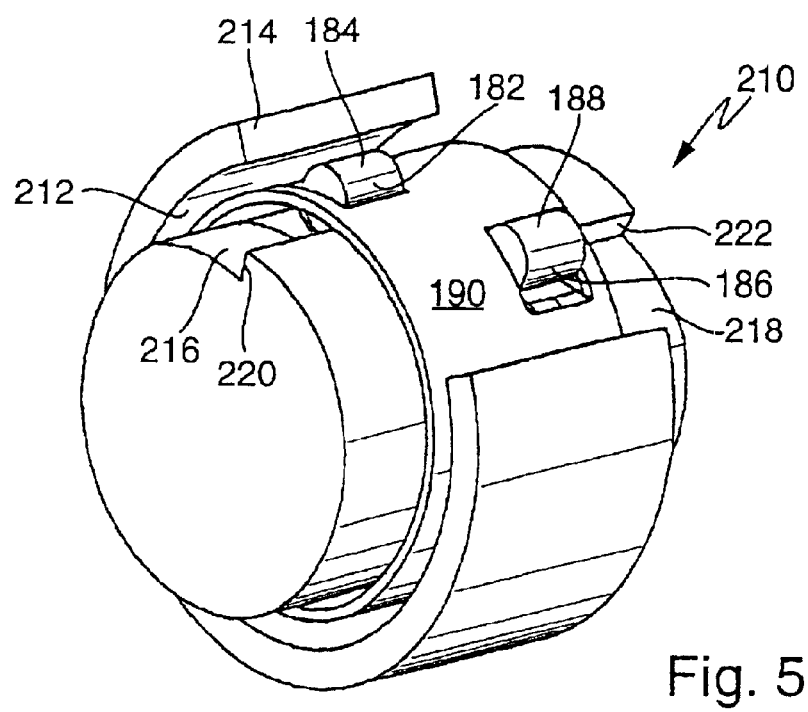
FIG. 5 shows an exemplary embodiment of the invention in a schematic, partial view.

FIG. 5 shows an exemplary embodiment of the invention in a partial schematic view.

FIG. 5 in particular shows a double clamping roll freewheel with internal star-shapes and a common retainer.

The double clamping roll freewheel 210 in accordance with FIG. 5 has a first clamping body 184 as well as a second clamping body 188.

The first clamping body 184 is the only clamping body in a first clamping body row 182, or it is one of several clamping bodies 184 that are arranged in the clamping body row in sequence circumferentially.

In a corresponding way, the second clamping body 188 is the only clamping body in a second clamping body row 186, or the second clamping body 188 is one of several clamping bodies in a clamping body row that are arranged in sequence circumferentially.

Clamping bodies 184, 188 are arranged in a common retainer 190.

Radially outside the clamping bodies 184, 188 extends a substantially unprofiled outer track 212 that is an interior surface of a component 214.

The unprofiled outer track 212 is arranged both at the first clamping body 184 and at the second clamping body 188.

Radially inside the first clamping bodies 184 there is provided a first profiled inner track 216, and radially inside clamping bodies 188 there is provided a second profiled inner track 218 that differs from the first profiled inner track 216 and is arranged rotatably opposite the first profiled inner track 216.

The first profiled inner track 216 has a projection 220 and the second profiled inner track 218 has a projection 222, whereby those projections 220, 222 extend in a substantially radial direction and serve as a stop for clamping body 184 or 188.

In the direction facing away from stop 220 or 222, the diameter of the double freewheel system 210 increases relative to the central axis of the double freewheel system 210.

The stops or projections 220, 222 are arranged in such a way that they act as stops in different directions of rotation.

The double freewheel system 210 in accordance with FIG. 5 can especially cooperate with a contact pressure system in accordance with the invention in such a way that the first profiled inner track 216 is coupled with the input member of a first ramp system of a torque sensor, and the second profiled inner track 218 is coupled with the second input member of a second ramp system of the torque sensor, whereby the unprofiled outer track 212 or the component 214 is coupled with a component that is loaded by an internal combustion engine.

The double freewheel system shown in FIG. 5 in particular makes it possible that as a function of the rotation or the loading direction of a contact pressure system in accordance with the invention in the circumferential direction, in each case the ramp is switched into the power or moment flow that is determined for that direction of rotation, thus, in particular, the acceleration or the deceleration ramp.

Figure 6:
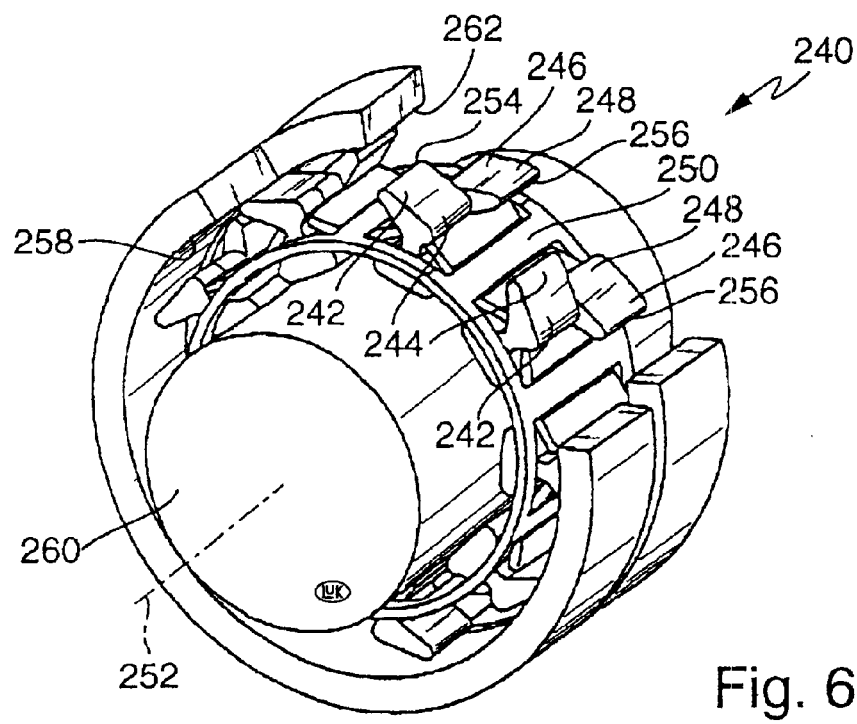
FIG. 6 shows an exemplary embodiment of the invention in a schematic, partial view.

FIG. 6 shows an exemplary embodiment of the invention in a partial schematic view.

The double clamping body freewheel system 240 shown in FIG. 6 with a common retainer has a first clamping body row 242 with first clamping bodies 244, as well as a second clamping body row 246 with second clamping bodies 248.

The first clamping body row 242 extends in the circumferential direction of the double clamping body freewheel system in such a way that the first clamping bodies 244 are arranged circumferentially in a row.

The second clamping body row 246 is configured in such a way that the second clamping bodies 248 are arranged in a row circumferentially relative to the double clamping body freewheel system 240.

The first clamping body row 242 and the second clamping body row 246, or the first clamping bodies 244 and the second clamping bodies 248, are arranged in a common retainer.

The first clamping bodies 244 and the second clamping bodies 248 extend in a radially outward direction at an oblique angle and in the circumferential direction; whereby the first clamping bodies 244 extend in the counterclockwise direction and the second clamping bodies 248 in the clockwise direction, or conversely.

In contrast to the clamping bodies in accordance with FIG. 4 and 5 as well as 7, the clamping bodies in the embodiment in accordance with FIG. 6 are not rollers but other forms of clamping bodies.

Clamping bodies 244, 248 are in each case arranged to be movable in the common retainer 250, specifically in such a way that they are arranged in a swingable position around axes that are parallel to the central axis 252 of the double clamping body freewheel system 210.

The first 244 and the second clamping bodies 248 have in each case radially outwardly lying ends 254, 256 that are spaced from the respective swing axes. A second clamping body 248 is arranged in the axial direction adjoining a first clamping body 244, whereby the radially outwardly lying end 254 of the first clamping body 244, when viewed in the circumferential direction, is arranged on another side of the associated swing axis than the radially outwardly lying end 256 of the second clamping body 248.

Upon loading in a first direction of rotation, the first clamping body 244 is raised up so that it is jammed between the first unprofiled outer track 258 and the unprofiled inner track 260, so that a torque can be transmitted between those tracks by frictional contact. In that direction of rotation, the second clamping body 248 is in a position in which it does not substantially frictionally connect the second unprofiled outer track 262 with the unprofiled inner track 260. The unprofiled inner track 260 is associated both with the first clamping body 244 and with the second clamping body 248.

Upon loading in the opposite direction of rotation, the conditions are reversed so that the second clamping body 248 is raised up and connects the second unprofiled outer track 262 with the unprofiled inner track 260, while the first clamping body 244 essentially does not substantially frictionally connect the first unprofiled outer track 258 with the unprofiled inner track 260.

Figure 7:
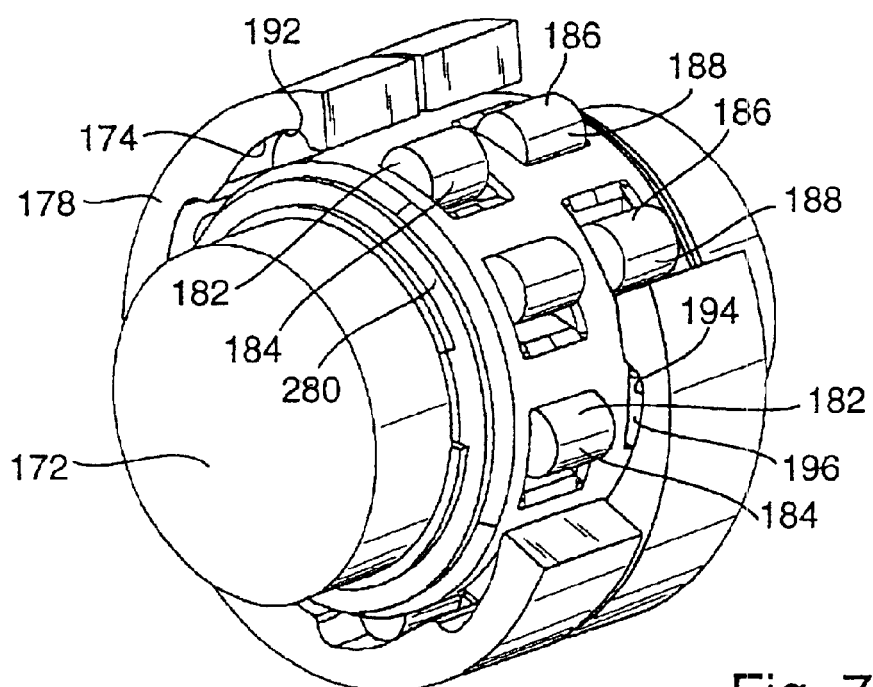
FIG. 7 shows an exemplary embodiment of the invention in a schematic, partial view.

FIG. 7 shows an exemplary embodiment of the invention that essentially differs from the embodiment in accordance with FIG. 4 in that one or several friction elements or friction disks 280 are provided that operate to hold in frictional connection the clamping roll or clamping body rows with the nonprofiled common running track, thus, here the inner track 172, at least in the area of the "open centers," so that a torque can be transmitted.

The friction element can in particular also be a friction ring or the like.

Figure 8:
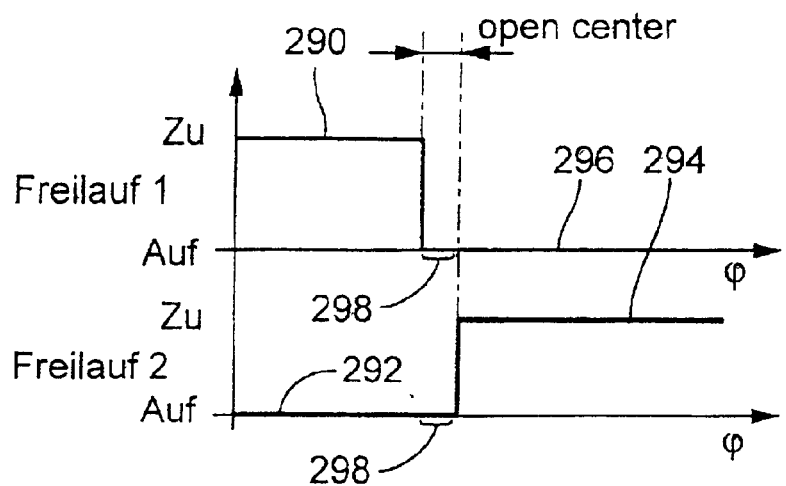
FIG. 8 shows an open status—rotation angle diagram of an exemplary embodiment of the invention in a schematic view.

FIG. 8 shows two graphs in which the switching position of the individual freewheels of a double freewheel is plotted against the rotation angle.

When the first freewheel, indicated by line 290, is in a closed position, the second freewheel, as indicated by line 292, is in an opened position.

When the second freewheel, on the other hand, as indicated by line 294, is in a closed position, the first freewheel, as indicated by line 296, is in an opened position. Between those rotation angles, in which the first or the second freewheel is in a closed position, there is provided a rotation angle area, indicated by reference numeral 298, in which both the first freewheel and the second freewheel of the double freewheel system are in an opened position.

Figure 9:
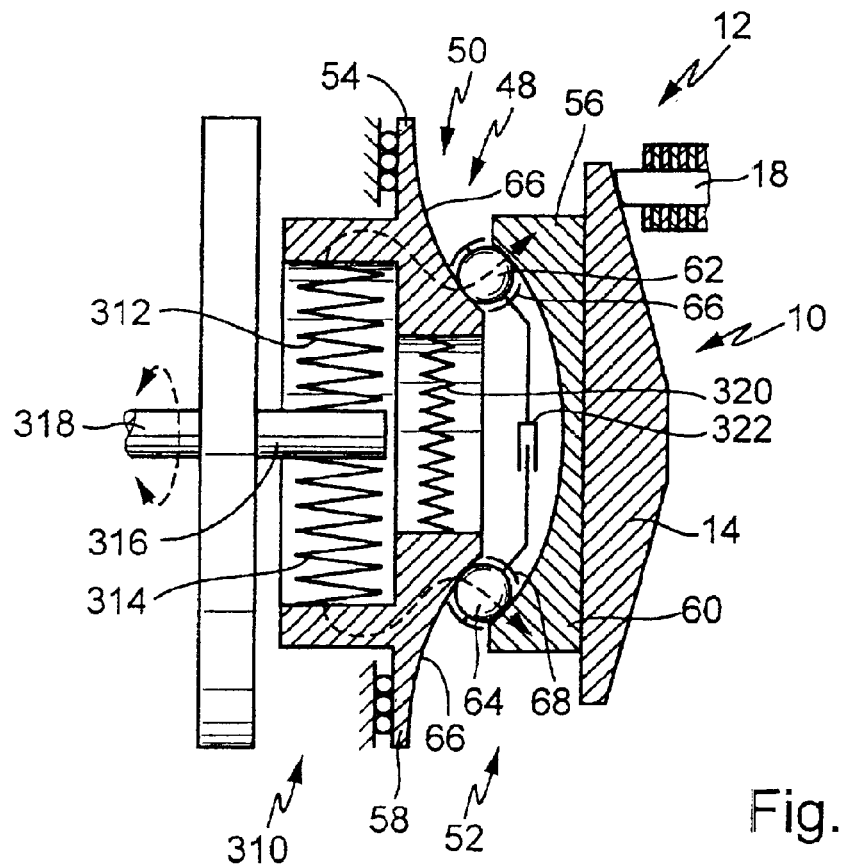
FIG. 9 shows an exemplary embodiment of the invention in a schematic, partial view.

FIG. 9 shows an exemplary embodiment of the invention in a partial schematic view.

FIG. 9 in particular shows a part of a continuously variable transmission 10 with a first 14 and a second conical disk (not shown) as well as a plate-link chain 18. There is further shown in FIG. 9 a contact pressure system 12 that can load the first conical disk 14 in the axial direction. Contact pressure system 12 has a torque sensor 48 that has an input member 54 as well an output member 56, whereby transmission bodies 62, 64 are provided between the input member 54 and the output member 56. Contact pressure system 12 or torque sensor 48 further has a first ramp system 50 as well as a second ramp system 52. The first ramp system 50 is provided with an acceleration flank and the second ramp system 52 is provided with a deceleration flank. In each case, ramps 66 and 68 are particularly provided, which cooperate in the transmission of power and/or moments during deceleration or acceleration between input member 54 and output member 56, or input member 58 and output member 60, by transmission bodies 62 or 64.

Contact pressure system 12 further has a spring system 310 with springs 312, 314. The spring or the springs 312 are arranged between a component 316 that is loaded by an internal combustion engine and the input member 54 of the first ramp system 50, so that in a power or moment transmission between that component 316 and the input member 54 of the first ramp system 50 that power or those moments are transmitted through spring 312.

In a corresponding way, the internal-combustion-engine-loaded or loadable component 316 is coupled to the input member 58 of the second ramp system 52 by the spring or the springs 314, so that power or moments are transmitted through spring 314 by a power or moment transmission between component 316 and input member 58 of the second ramp system 52.

Component 316 is non-rotatably connected with shaft 318, which is connected with an internal combustion engine in such a way that that the internal combustion engine can load shaft 318. It is particularly provided that component 316 is an area of shaft 318 or is formed integrally with shaft 318. In accordance with the invention, of course, components 316 are also preferred that are not connected integrally with shaft 318. Springs 312, 314 in particular work in the circumferential direction or at least partially in the circumferential direction.

Input member 54 of the first ramp system 50 or ramp 66 is connected with the input member 58 of the second ramp system 52 or with ramp 68 by a spring unit 320.

It should be noted that when in the sense of the invention a ramp is spoken of, also intended is that a ramp is provided on the output member of the ramp system and/or on the input member of the ramp system. Particularly preferred is that transmission bodies are arranged between two ramps, one of which is arranged on the input member and one on the output member of a ramp system.

Transmission bodies 62 and 64, that are associated with different ramp systems, are, if necessary, coupled by a damper unit 322, which particularly is connected parallel to the spring unit 320.

Figure 10:
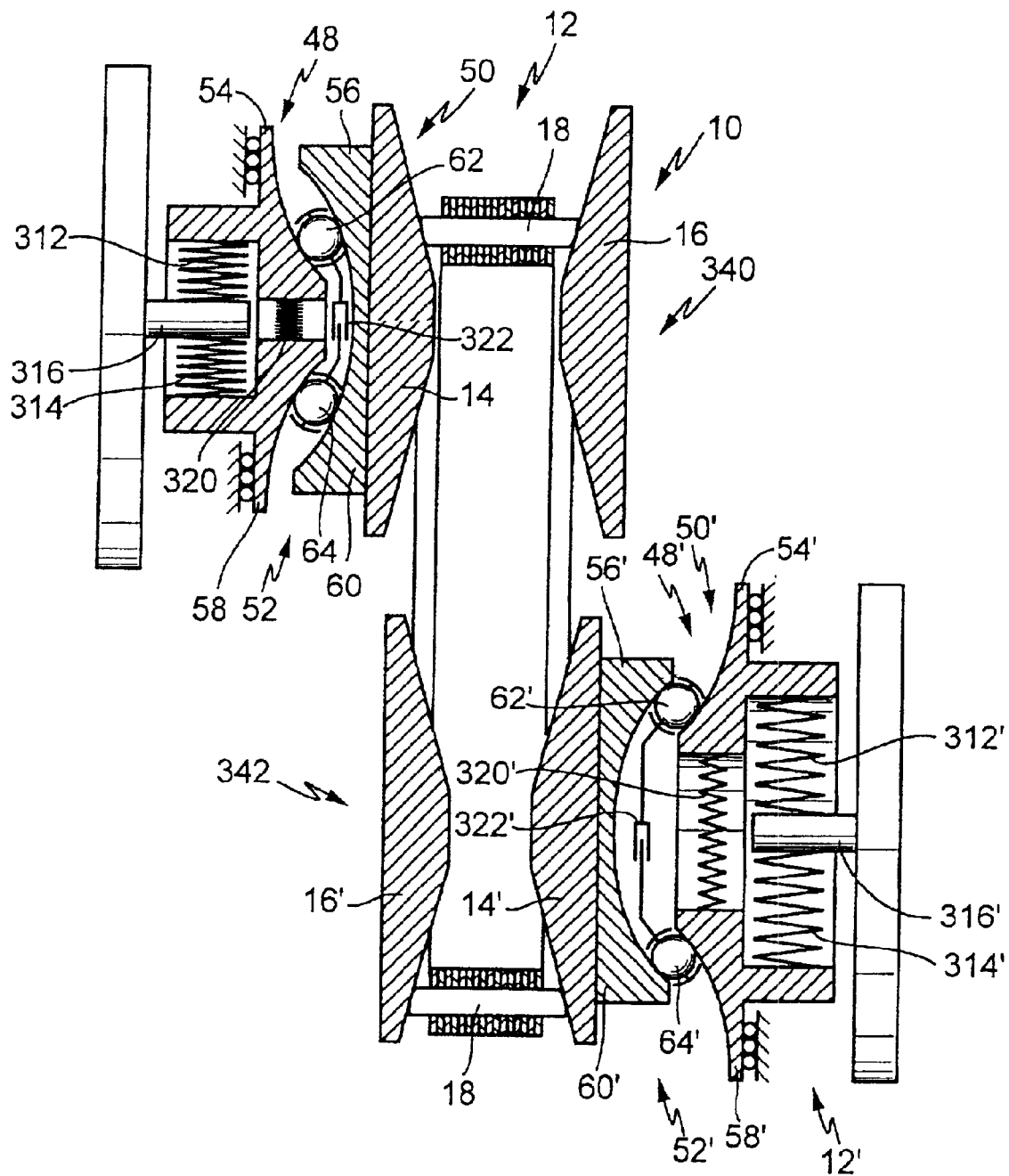
FIG. 10 shows an exemplary embodiment of the invention in a schematic, partial view.

FIG. 10 shows an exemplary embodiment of the invention in a partial schematic view.

FIG. 10 particularly shows a continuously variable transmission 10 that has a first disk set 340 as well as a second disk set 342.

The first disk set 340 can be loaded in an axial direction by a contact pressure system 12, and the second disk set 14', 16' can be loaded by a second contact pressure system 12'.

The first contact pressure system 12 is preferably essentially configured as is the second contact pressure system 12'. The first disk set 340 with contact pressure system 12 corresponds substantially with the one that was explained in connection with FIG. 9.

In a corresponding way, disk set 14', 16' with contact pressure system 12' essentially corresponds with the disk set with contact pressure system 12 explained in connection with FIG. 9.

Components of the second disk set 342 or the second contact pressure system 12', that substantially correspond with those of the respective first disk set 340, or the first contact pressure system 12, are provided with the same reference numerals as well as an apostrophe ("'").

FIG. 10 shows a system in accordance with the invention in an underdrive position. In the underdrive position, springs 312, 314, 320 are strongly pressed together, while springs 312', 314', 320' are under tension but have a lower tension than springs 312, 314, 320.

In an overdrive position, those tension conditions of the springs are reversed.

FIG. 11 shows an exemplary embodiment in accordance with the invention by which to load the second disk set 342 there is provided, in place of a second contact pressure system 12' with a second torque sensor 48', a second contact pressure system 12' with a spindle 350.

A portion 352 of spindle 350 is axially rigidly connected with the second conical disk 16'. In that case, spindle 350 is supported opposite to the first conical disk 16' by suitable bearing means 358, such as a roller bearing, or a sliding bearing, or a needle bearing, or the like. A rotation of spindle 350 causes a loading of the second conical disk set 342, or a change in the contact pressure force on the second conical disk set 342, or a change of the axial spacing of the conical disks 14', 16' of the second conical disk set 342.

FIG. 12 shows exemplary spring characteristics as a function of the transmission ratio controlled by a continuously variable transmission. Those spring characteristics particularly relate to the transmission springs 314, 314', 316, 316', by which the input member 54, 58, 54', 58' of the torque sensor 48, 48' or of the ramp system 50, 50', 52, 52' is loaded.

From FIG. 12 it can be concluded that at a minimum transmission ratio i, the spring force of spring 314, 316 of the first disk set 340 (SS1) is at a maximum and falls linearly with increasing transmission ratio, while the spring force of spring 312', 314' of the second disk set 342 (SS2) is at a minimum at a minimal transmission ratio and rises linearly with increasing transmission ratio.

The spring characteristics in accordance with FIG. 12 relate especially to a system in accordance with FIG. 10.

FIG. 13 shows a further exemplary spring characteristic that a spring 312, 314 of a system (SS1) in accordance with the invention can have. The spring characteristic in accordance with FIG. 13 relates especially to the illustration in accordance with FIG. 11.

The spring characteristic corresponds substantially with the spring characteristic of the first set of disks 340, that was explained in conjunction with FIG. 12.

The claims included in the application are exemplary and are without prejudice to acquiring wider patent protection. The applicant reserves the right to claim additional combinations of features disclosed in the specification and/or drawings.

The references contained in the dependent claims point to further developments of the object of the main claim by means of the features of the particular claim; they are not to be construed as renunciation to independent, objective protection for the combinations of features of the related dependent claims.

Although the subject matter of the dependent claims can constitute separate and independent inventions in the light of the state of the art on the priority date, the applicants reserve the right to make them the subject of independent claims or separate statements. They can, moreover, also embody independent inventions that can be produced from the independent developments of the subject matter of the included dependent claims.

The exemplary embodiments are not to be considered to be limitations of the invention. On the contrary, many changes and variations are possible within the scope of the invention in the existing disclosure, in particular such variants, elements, and combinations and/or materials which, for example, are inventive by combining or modifying single features that are in combination and are described individually in relation to the general specification and embodiments as well as the claims and shown in the drawings, as well as elements or method steps that can be derived by a person skilled in the art in the light of the disclosed solutions of the problem, and which by means of combined features lead to a new object or new method steps or sequences of method steps, as well as manufacturing, testing and operational procedures.

What is claimed is:

1. A contact pressure system for a continuously variable transmission, said system comprising: at least one torque sensor having an input side that is loaded with a torque from a power source and having an output side that provides a contact pressure force that acts on an axially-movable disk and that depends on the torque applied on the input side, wherein the contact pressure system includes at least one transfer unit positioned between the power source and the torque sensor and that transfers torque between the power source and the torque sensor, a first component of the torque sensor that is connected into the flow of power when a torque is applied to the torque sensor in a first direction, and a second component of the torque sensor that is switched into the flow of force when a torque acts on the torque sensor in a second direction opposite to the first direction.

2. A contact pressure system in accordance with claim 1, wherein at least one set of rotatable disks is operatively coupled with the contact pressure system, and wherein a torque that is applied to the input side of the torque sensor system differs from a torque that is transmitted between the at least one set of disks and a second set of rotatable disks that is operatively coupled with the at least one set of disks.

3. A contact pressure system in accordance with claim 1, wherein the contact pressure system includes elements having ramps that extend at an angle that is oriented circumferentially relative to an axis of rotation of the torque sensor, wherein for different directions of rotation of the torque sensor different ramps are provided, and wherein a freewheel is provided for each of the different directions of rotation.

4. A contact pressure system in accordance with claim 3, wherein the freewheel is a double freewheel system that cooperates with the torque sensor.

5. A contact pressure system in accordance with claim 4, including a switchover device that switches the freewheel between predetermined rotation-direction-dependent control characteristics when the direction of rotation of the torque is changed.

6. A contact pressure system in accordance with claim 3, including means for providing that at least one ramp of the torque sensor is operative upon at least one adjoining power transmission component, and that ensures that, as a function of the direction of loading, a particular ramp intended for that direction of loading is arranged in the flow of power.

7. A contact pressure system in accordance with claim 3, wherein the torque sensor has different ramps including a first ramp by which a torque is to be transmitted when the torque sensor is loaded in a first direction, and at least a second ramp by which a torque is to be transmitted when the torque sensor system is loaded in a second direction opposite to the first direction, and wherein a freewheel unit is provided with at least one first freewheel associated with the first direction of rotation, as well as with at least one second freewheel associated with the second direction of rotation, and means for preventing jamming of the freewheels when the direction of rotation of the torque sensor changes.

8. A contact pressure system in accordance with claim 1, including at least one spring system associated with the torque sensor and through which torque is transmitted.

9. A contact pressure system in accordance with claim 1, wherein the transmission ratio of the transfer unit is adjustable.

10. A contact pressure system in accordance with claim 1, wherein the transfer unit is a planetary transmission including a sun gear, a ring gear, and planet gears that engage the sun gear and the ring gear and that are supported in a planetary gear carrier.

11. A contact pressure system in accordance with claim 10, wherein the sun gear of the planetary transmission is non-rotatably coupled with a shaft that is coupled to the power source.

12. A contact pressure system in accordance with claim 10, wherein the carrier of the planetary transmission is non-rotatably coupled with an input member of the torque sensor.

13. A contact pressure system in accordance with claim 10, wherein a differential torque between an input torque applied to the sun gear of the planetary transmission and a carrier torque applied to the input side of the torque sensor is returned as a reactive torque between the output side of the torque sensor and the ring gear of the planetary transmission.

14. A contact pressure system in accordance with claim 10, wherein the planetary transmission has noncircular gears.

15. A contact pressure system in accordance with claim 2, wherein torque that is transmitted from the transfer unit in the direction of the set of disks of the continuously variable transmission depends on the transmission ratio between the sets of disks of the continuously variable transmission.

16. A contact pressure system in accordance with claim 1, wherein at least one gear of the transfer unit has the shape of an ellipse.

17. A contact pressure system in accordance with claim 10, wherein the sun gear and the planet gears are elliptical.

18. A contact pressure system in accordance with claim 10, wherein torque transmitted from the planetary transmission to the continuously variable transmission is transmitted from the carrier of the planetary transmission.

19. A contact pressure system in accordance with claim 1, wherein the torque sensor includes a system of linear ramps that extend in a circumferential direction of the torque sensor.

20. A contact pressure system in accordance with claim 1, wherein the torque sensor includes a ramp system of non-linear ramps that extend in a circumferential direction of the torque sensor.

21. A contact pressure system in accordance with claim 1, wherein the torque sensor has different ramps, and means for controlling by which of the ramps a torque is transmitted.

22. A contact pressure system in accordance with claim 1, wherein the torque sensor includes ramps, wherein at least one ramp is provided for each direction of rotation, and wherein those ramps associated with the various directions of rotation are uncoupled.

23. A contact pressure system in accordance with claim 1, wherein the torque sensor has ramps against at least one of which at least one torque-transmitting component of the torque sensor is supported.

24. A contact pressure system in accordance with claim 1, wherein the first component includes at least one first ramp.

25. A contact pressure system in accordance with claim 24, wherein the second component includes at least a second ramp.

26. A contact pressure system in accordance with claim 25, wherein the first ramp is rotatable relative to the second ramp.

27. A contact pressure system in accordance with claim 25, wherein the at least one first ramp is coupled with the at least one second ramp by at last one spring element.

28. A contact pressure system in accordance with claim 25, wherein at least one of the first ramp and the second ramp extends in a circumferential direction of the torque sensor.

29. A contact pressure system in accordance with claim 25, wherein at least one of the first ramp and the second ramp extends in a circumferential direction and in a radial direction of the torque sensor.

30. A contact pressure system in accordance with claim 25, including a damper unit provided between the at least one first ramp and the at least one second ramp.

31. A contact pressure system in accordance with claim 1, wherein the first component includes a first freewheel and the second component includes a second freewheel, and wherein the first and second freewheels are coupled with each other.

32. A contact pressure system in accordance with claim 31, wherein during a switchover between the first freewheel and the second freewheel there exists a region within which both freewheels are in an opened, non-torque-transmitting condition.

33. A contact pressure system in accordance with claim 31, wherein the first and the second freewheels each include at least one transmitting body, and a common retainer is provided for the transmitting bodies of the first and the second freewheel.

34. A contact pressure system in accordance with claim 33, wherein the transmitting body is a rolling element.

35. A contact pressure system in accordance with claim 33, wherein the transmitting bodies in each case operate along a respective profiled track, and wherein at least one of the profiled tracks is arranged radially outward of the transmitting bodies that operate on that track.

36. A contact pressure system in accordance with claim 33, wherein the transmitting bodies in each case operate along a respective profiled track, and wherein at least one of the profiled tracks is arranged radially inward of the transmitting bodies that operate on that track.

37. A contact pressure system in accordance with claim 31, wherein the first and the second freewheel have at least one transmitting body and that at least one transmitting body is associated with both the first and the second freewheel.

38. A contact pressure system in accordance with claim 31, wherein the first and the second freewheels each have at least one transmitting body and respective unprofiled tracks, wherein the unprofiled tracks are non-rotatably connected with each other.

39. A contact pressure system in accordance with claim 33, including a retaining device that holds predetermined transmitting bodies at a spacing with respect to a first running track and in contact with a second running track, and wherein the running tracks and the transmitting bodies are associated with the same freewheel.

40. A contact pressure system in accordance with claim 33, including a catch device between at least one transmitting body and at least one track, so that upon movement of that track a circumferential force acts on the transmitting body of the freewheel when the freewheel is in an opened position.

41. A contact pressure system in accordance with claim 40, wherein the catch device is a friction device.

42. A contact pressure system in accordance with claim 33, wherein during torque transmission by the freewheels the transmitting bodies are clamped between two tracks, and wherein the transmitting bodies are arranged in a radial direction between the tracks.

43. A contact pressure system in accordance with claim 33, wherein the transmitting bodies associated with different freewheels are spaced from each other in an axial direction.

44. A contact pressure system in accordance with claim 33, wherein the transmitting bodies associated with a respective freewheel are arranged in series.

45. A contact pressure system in accordance with claim 38, wherein at least one track of a freewheel is operatively coupled with a component of the torque sensor.

46. A contact pressure system in accordance with claim 38, wherein at least one track of a freewheel is operatively coupled with a component of a set of disks.

47. A contact pressure system in accordance with claim 35, wherein tracks associated with different freewheels are movable relative to each other.

48. A contact pressure system in accordance with claim 35, wherein tracks associated with different freewheels are movable relative to each other, and wherein the track associated with the first freewheel is arranged in a fixed manner with respect to the track that is associated with the second freewheel.

49. A contact pressure system in accordance with claim 35, wherein at least a first transmitting body is associated with at least one first running track whereby a torque is transmitted by that first transmitting body and that first running track when the torque sensor is loaded in a first direction of rotation;

at least a second transmitting body is associated with at least a second running track, whereby a torque is transmitted by that second transmitting body and that second running track when the torque sensor is loaded in a second direction of rotation;

wherein the first transmitting body is arranged at a predetermined phase angle relative to the second transmitting body;

wherein the first running track is arranged at a predetermined phase angle with relation to the second running track; and wherein the phase angle between the transmitting bodies is smaller than the phase angle between the running tracks.

50. A contact pressure system in accordance with claim 3 including a spring system for ensuring that appropriate ramps are in engagement with a power transmitting component of the torque sensor to correspond with a direction of power flow through the torque sensor.

51. A contact pressure system in accordance with claim 21, including a spring system for controlling which ramp is to be switched into the flow of power.

52. A contact pressure system in accordance with claim 51, wherein at least one ramp of the torque sensor is coupled with at least one spring of the spring system.

53. A contact pressure system in accordance with claim 51, wherein at least one ramp of the torque sensor is coupled by at least one spring of the spring system with a component coupled with the power source.

54. A contact pressure system in accordance with claim 51, wherein at least one spring of the spring system transmits torque between a ramp of the torque sensor and a component coupled with the power source, whereby the at least one spring is arranged on the input side of the torque sensor.

55. A contact pressure system in accordance with claim 51, wherein at least one first spring of the spring system transmits torque between a first ramp of the torque sensor and a component coupled with the power source, and wherein at least a second spring of the spring system transmits torque between a second ramp of the torque sensor and a component coupled with the power source, whereby the first and second springs are arranged on the input side of the torque sensor.

56. A contact pressure system in accordance with claim 54, wherein the at least one spring is subject to increasing tension with increasing running radius of an endless torque-transmitting means that engages a set of disks that is associated with the at least one spring.

57. A contact pressure system in accordance with claim 54, wherein the at least one spring is under tension at a maximum running radius of an endless torque-transmitting means that engages the set of disks associated with the at least one spring.

58. A contact pressure system in accordance with claim 1, wherein the contact pressure system is operative to control a contact pressure in the continuously variable transmission that includes a set of disks on an input side, as well as a set of disks on an output side of the continuously variable transmission.

59. A contact pressure system in accordance with claim 58, wherein the torque sensor is arranged on the input side disk set.

60. A contact pressure system in accordance with claim 58, wherein the torque sensor is arranged on the output side disk set.

61. A contact pressure system in accordance with claim 50, wherein the spring system is arranged on the input side of the torque sensor.

62. A contact pressure system in accordance with claim 50, wherein the spring system is arranged on the output side of the torque sensor.

63. A contact pressure system in accordance with claim 50, wherein when a torque is applied to the torque sensor during a rotation direction change, a spring force acts against the ramp.

64. A contact pressure system in accordance with claim 50, wherein the spring system is a vibration damper.

65. A contact pressure system in accordance with claim 1, wherein the contact pressure force acts against at least one disk of a set of disks, whereby that set of disks has two disks that are arranged so that they are movable relative to each other.

66. A contact pressure system in accordance with claim 65, wherein the contact pressure system acts against different disks.

67. A contact pressure system in accordance with claim 1, wherein the contact pressure force is produced as a function of a running radius of an endless torque-transmitting means carried by a set of disks.

68. A contact pressure system in accordance with claim 1, wherein the torque sensor has at least one ramp as well at least one power transmitting body, wherein the power transmitting body and the ramp are movable relative to each other, wherein a relative position between the power transmitting body and the ramp is a function of the input side torque, and wherein different relative positions between the power transmitting body and the ramp result in different contact pressure forces.

69. A contact pressure system in accordance with claim 1, wherein the torque sensor has at least one ramp having different positions therealong that are associated with different running radii of an endless torque-transmitting means carried on a set of rotatable disks of a the continuously variable transmission that are associated with that at least one ramp, and wherein the at least one ramp has a gradient that increases with increasing running radius of the endless torque-transmitting means.

70. A contact pressure system in accordance with claim 69, wherein the contact pressure force is a function of the gradient of the ramp.

71. A contact pressure system in accordance with claim 1, wherein the torque sensor includes different components that are rotated relative to each other as a result of the torque sensor with an applied torque, and wherein the contact pressure force produced by the torque sensor is a function of the relative angle of rotation of those components.

* * * * *